Nov. 3, 1925.    1,560,093

F. S. OREM

PISTON RING

Filed March 12, 1920

Inventor:

Frederick Strattner Orem,

By Spear, Middleton, Donaldson & Hall
Attorneys.

Patented Nov. 3, 1925.

1,560,093

UNITED STATES PATENT OFFICE.

FREDERICK STRATTNER OREM, OF BALTIMORE, MARYLAND.

PISTON RING.

Application filed March 12, 1920. Serial No. 365,228.

*To all whom it may concern:*

Be it known that I, FREDERICK STRATTNER OREM, a citizen of the United States, and a resident of the city of Baltimore and State of Maryland, have invented certain new and useful Improvements in Piston Rings, of which the following is a specification.

My invention relates to piston rings for automobile or other engines and one object is to provide a ring of composite form which will be self-adjusting and which will maintain contact with the walls of the piston groove under all conditions of wear and period of use and will prevent the passage of the oil or products of combustion around back of the ring and through the groove.

Figure 1:
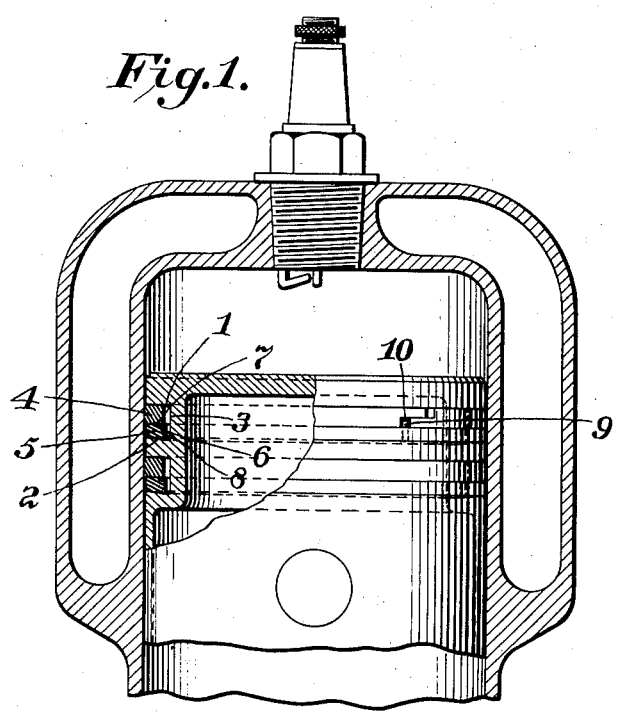
Figure 1 represents a portion of a cylinder and piston with my improved ring in place.
Figure 2:
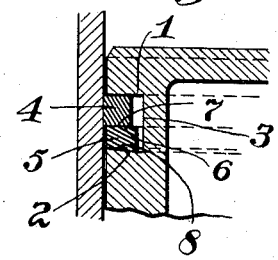
Fig. 2 is a detail view, enlarged.
Figure 3:
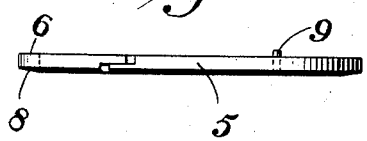
Fig. 3 is a view of the ring detached from the piston.
Figure 4:
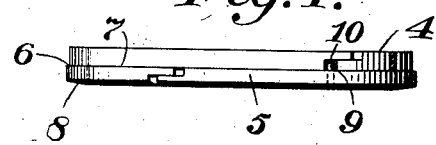
Fig. 4 represents the two members of the ring.

In carrying out my invention, the piston is provided with a groove extending circumferentially, having one wall 1 arranged in a plane at right angles to the axis of the piston, and the other side wall 2 is arranged in a plane at an inclination to the axis of the piston or in a conical plane. This provides a groove which is wider at its face or back portion 3 than it is at its mouth, and in this groove the two parts 4 and 5 composing the ring are placed. The member 4 is rectangular in cross section and thus provides one face to fit flat against the face or side wall 1 of the groove and the other member 5 of the composite ring has one face, indicated at 6, to lie in a plane at right angles to the piston and hence this face will fit flat against the face 7 of the member 4.

The side face 8 of the member 5 is inclined so as to fit flat upon the inclined side wall of the groove at 2. Each member of the ring is split and is of spring character tending constantly to open and thus maintain contact with the cylinder wall.

It will be clear that a ring so constituted will take up wear that may occur upon the side walls of the groove and the ring will have a constant compensating action in connection with any wear that takes place either upon the side walls of the groove or between the contacting faces of the ring members themselves. As the groove wears wider and the rings wear narrower, the wedge-shaped ring will follow up this wearing action by pressing or springing outwardly, thus keeping its inclined wall against the inclined face of the groove, and at the same time, pressing the rectangular ring member against the opposite wall of the groove. By thus maintaining full contact between the ring members and also between these members and the side walls of the groove, leakage of the fuel or lubricating oil through the groove at the back of the piston ring will be prevented.

The wedge-shaped ring should be about one two-thousandth (1/2000) of an inch smaller in diameter than the square or rectangular ring when first installed in the piston and cylinder. After the cylinder and rings have been in use for a short time and have become smooth, the wedge-shaped ring will also become operative against the cylinder wall and will supplement the sealing action of the main section of the ring at this point.

The rectangular ring is made in the usual way, that is, it is turned slightly larger in diameter than the cylinder. It is then cut and closed and ground to fit the cylinder. The wedge ring is machined in a similar way but is turned a little larger in diameter than the square ring and is cut and closed and ground on its exterior. The purpose of turning the wedge ring larger in diameter than the square ring is to place the wedge ring under a greater degree of tension than the square ring because it is the function of the wedge ring to exert a wedging action against the square ring to keep it seated against the groove wall, and also this wedge ring aids or supplements the spring action of the main ring. Of course, when the wedge ring is turned larger than the square ring, there will be a wider opening in the wedge ring when cut so that when this is closed and positioned in the cylinder, it will naturally provide considerable tension on this account.

The two ring members may be interlocked in any suitable way to prevent the creeping of one in relation to the other, and as one means of accomplishing this, I employ a pin 9 on the wedge ring entering the notch 10 formed at the split portion of the main ring.

What I claim is:

In combination, a piston for internal combustion engines having a single groove for receiving packing, said groove in cross section having one wall in a plane at right angles to the axis of the piston and having its opposite wall inclined to said axis and convergent with the wall first mentioned towards the mouth of the groove, both of the said walls together with the bottom wall being imperforate, and two rings located in said groove, each of which is a split spring ring, one of said rings being rectangular in cross section and fitting against the said right angular side of the groove, and the other of said rings being wedge shape, with one side conforming to and fitting against the ring first mentioned and its other side conforming to and fitting against the inclined side of said groove, both of said rings having comparatively broad outer faces to bear on the cylinder wall the wedge ring being of greater tension than the square ring, both of said spring rings occupying a space no wider than the groove of the piston, and with the lateral ring face nearest to the combustion chamber extending substantially in the plane of the upper wall of the groove clear to the cylinder wall substantially as described.

In testimony whereof, I affix my signature.

FREDERICK STRATTNER OREM.